United States Patent [19]

Hugl et al.

[11] Patent Number: 5,238,570

[45] Date of Patent: Aug. 24, 1993

[54] ASYMMETRIC SEMIPERMEABLE MEMBRANES OF AROMATIC POLYCONDENSATES, PROCESSES FOR THEIR PREPARATION AND THEIR USE

[75] Inventors: Herbert Hugl, Bergisch Gladbach; Rolf Dhein, Krefeld; Ralf Dujardin, Willich; Karlheinz Hildenbrand; Knud Reuter, both of Krefeld, all of Fed. Rep. of Germany

[73] Assignee: Bayer Aktiengesellschaft, Leverkusen, Fed. Rep. of Germany

[21] Appl. No.: 964,171

[22] Filed: Oct. 21, 1992

[30] Foreign Application Priority Data

Oct. 31, 1991 [DE] Fed. Rep. of Germany ....... 4135847

[51] Int. Cl.$^5$ .................. B01D 61/14; B01D 61/24; B01D 71/38; B01D 71/68
[52] U.S. Cl. ................. 210/500.27; 210/654; 210/500.28; 210/500.41
[58] Field of Search ............... 210/500.35, 500.36, 210/500.27, 500.24, 500.28, 500.35, 500.33, 500.36, 500.41, 500.21, 634, 644–654; 264/41, 45.1, DIG. 62, DIG. 48

[56] References Cited

U.S. PATENT DOCUMENTS 4,992,221  2/1991  Malon et al. .................. 264/41

*Primary Examiner*—Frank Sever

*Attorney, Agent, or Firm*—Sprung, Horn, Kramer & Woods

[57] ABSTRACT

Asymmetric semipermeable membranes which consist of aromatic polycondensates having recurring units of the formula $$(-O-Z-O-Y-)_n \quad (I)$$

in which
Y is the divalent radical of an aromatic sulphone or of an aromatic ketone and
—O—Z—O— is a divalent diphenolate radical which consists to the extent of 0.1–100 mol % of all the diphenolate radicals of those of the formula

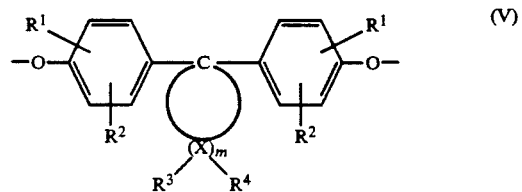

with the meaning given in the description, are suitable for haemodialysis, haemodiafiltration, haemofiltration, ultrafiltration, microfiltration and reverse osmosis.

16 Claims, No Drawings

ASYMMETRIC SEMIPERMEABLE MEMBRANES OF AROMATIC POLYCONDENSATES, PROCESSES FOR THEIR PREPARATION AND THEIR USE

BACKGROUND OF THE INVENTION

1. Field of the Invention

The invention relates to permselective, asymmetric membranes based on heat- and hydrolysis-stable aromatic polycondensates. These are particularly suitable for haemodialysis, haemodiafiltration, ultrafiltration, microfiltration and reverse osmosis and as a support membrane for the preparation of composite membranes. The invention also relates to the preparation of such membranes and to the use mentioned.

Haemodialysis, haemodiafiltration and haemofiltration are known processes for detoxification of blood (washing-out of blood), that is to say for removal of toxic metabolites present even in a low concentration and excess water. In these processes, the blood from the artery of the patient is passed through an artifical kidney in which the blood flows along a semipermeable membrane. On the other side of the membrane is a rinsing liquid of appropriate composition, into which the toxic substances migrate through the semipermeable membrane. The purified blood is passed back to the body of the patient.

In haemodialysis, transportation is effected via a solution process in the membrane, which is followed by a diffusion step, while a haemofiltration membrane is a pore membrane, the pore diameter of which determines the molecular weight exclusion limit. In haemodiafiltration, as the name of this process suggests, transportation is effected by both the principles mentioned, that is to say both separation via solution-diffusion mechanisms and separation via the membrane pore diameter.

2. Description of the Related Art

A wide range of polymers have been proposed for these processes, for example cellulose acetate (NTIS Report PB 225 069), polyacrylonitrile (German Auslegeschrift 2,145,183), polysulphone (German Auslegeschrift 2,228,537), aromatic polyamide or polyimide (German Auslegeschrift 2,342,072), diisocyanate addition polymers (German Patent Specification 3,341,847) and polyamide mixtures (EP 305,787). The membranes described in the publications mentioned all have specific disadvantages because of their chemical composition and their architectonic structure, such as a lack of strength, a lack of haemocompatibility, too high or too low an absorption of water, a lack of heat stability (important during sterilisation with superheated steam), water-soluble or blood-soluble, harmful additives, a lack of absence of defects, such as pinholes, gelatinous bodies and the like, which cause holes in the membrane after the precipitation, a lack of chemical stability or the undesirable necessity of having to blend/alloy the materials with hydrophilic polymers to achieve acceptable dialytic permeabilities.

This results in the fundamental requirement of development of new membranes for washing-out blood which offer the patient the best possible comfort with the lowest risk and lowest stress during the treatment.

SUMMARY OF THE INVENTION

It has now been found that membranes having performance data which render them highly suitable for use in blood purification processes can be prepared from aromatic polycondensates by phase inversion processes (compare R.E. Kesting "Synthetic Polymeric Membranes", 2nd Edition, 1985, page 237 et seq.).

The invention accordingly relates to asymmetric semipermeable membranes of aromatic polycondensates having recurring units of the formula

$$(-O-Z-O-Y-)_n \qquad (I)$$

wherein n assumes numerical values from 10 to 500, preferably from 25 to 100,

Y is the divalent radical of an aromatic sulphone or of an aromatic ketone of the formula

$$-Ar-SO_2-Ar'- \qquad (II)$$

or

$$-Ar-CO-Ar'- \qquad (III)$$

in which

—Ar— and —Ar'—independently of one another are difunctional aromatic radicals having 6 to 50 C atoms, and

$$-O-Z-O- \qquad (IV)$$

is a divalent diphenolate radical, wherein, amongst the diphenolate radicals —)—Z—O—, 0.1 mol % to 100 mol %, preferably 3 mol % to 100 mol % and in particular 10 mol % to 100 mol % of all the diphenolate radicals are those of the formula

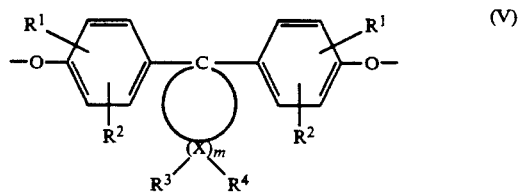

in which $R^1$ and $R^2$ independently of one another denote hydrogen, halogen, preferably chlorine or bromine, $C_1$–$C_8$-alkyl, $C_5$–$C_6$-cycloalkyl, $C_6$–$C_{10}$-aryl, preferably phenyl, or $C_7$–$C_{12}$-aralkyl, preferably phenyl-$C_1$–$C_4$-alkyl, in particular benzyl and cumyl, m represents an integer from 4 to 7, preferably 4 or 5, $R^3$ and $R^4$ independently of one another represent hydrogen or $C_1$–$C_6$-alkyl and X denotes carbon, wherein $R^3$ and $R^4$ can differ for each X, and on at least one X, the substituents $R^3$ and $R^4$ simultaneously represent alkyl.

DETAILED DESCRIPTION OF THE INVENTION $R^3$ and $R^4$ are preferably simultaneously alkyl on 1-2 atoms X, in particular on only one atom X. The preferred alkyl radical is methyl; the X atoms in the α-position relative to the di-phenyl-substituted C atom (C1)

are preferably not dialkyl-substituted, while alkyl disubstitution in the β-position relative to Cl is preferred.

Particularly preferred starting materials are dihydroxy-diphenylcycloalkanes having 5 or 6 ring C atoms in the cycloaliphatic radical (m=4 or 5 in formula (V)), such as, for example, the diphenols of the formulae

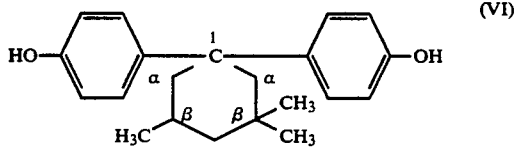

(VI)

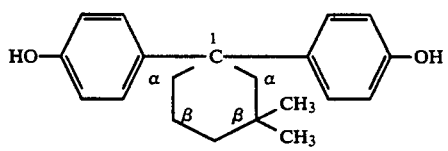

(VII)

and

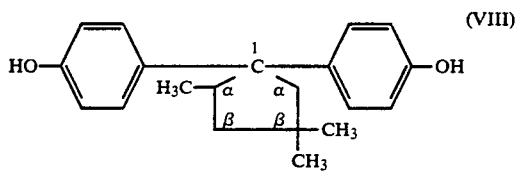

(VIII)

1,1-bis-(4-hydroxyphenyl)-3,3,5-trimethyl-cyclohexane (formula VI) being particularly preferred.

The aromatic polycondensates of the formula (I) are known from German Offenlegungsschrift 3,833,385 and German Offenlegungsschrift 3,833,386. Films of these aromatic polycondensates are also known. They are described in German Offenlegungsschrift 3,836,162 and German Offenlegungsschrift 3,836,169. These films, which are produced in particular by extrusion processes, can also be employed as membranes for separation of gases. In contrast to these films, which cannot be used for processes such as haemodialysis, haemodiafiltration, haemofiltration, ultrafiltration, microfiltration and reverse osmosis or as a support membrane for the preparation of composite membranes, the membranes according to the invention have an asymmetric organisation and preferably a microporous structure.

To prepare the membranes according to the invention by the phase inversion process, the aromatic polycondensates of the formula (I) are dissolved in aprotic, polar solvents, preferably NMP (N-methyl-pyrrolidone), DMF (dimethylformamide), DMAc (dimethylacetamide) or DMSO (dimethylsulphoxide) to give a casting solution.

This procedure can be carried out in accordance with the prior art with addition of solubilising agents, such as lithium chloride, calcium chloride and the like, or with the addition of suitable pore-forming agents (R.E. Kesting, loc. cit.). The content of the casting solution for these procedures is adjusted to 5-30 % by weight of polymer; the viscosity of such casting solutions is 2,000-25,000 centipoise (measured using a Brookfield viscometer).

Such a casting solution in an aprotic, polar solvent, preferably of the type mentioned as examples, is spread to a film on a level substrate or processed to hollow filaments, tubes or capillaries. An auxiliary solvent (precipitating agent) which is miscible with the aprotic, polar solvent but is not a solvent for the polycondensate is then allowed to act on the film or the hollow filament, tube or capillary in the sense of the phase inversion process. This auxiliary solvent withdraws the aprotic polar solvent from the film, the hollow filament, the tube or the capillary and thus precipitates the polymer in the form of the membrane according to the invention.

Such an auxiliary solvent (precipitating agent) can be, for example, water or a lower alcohol. Further washing steps can follow for removal of the aprotic, polar solvent without residue. Thereafter, if the proposed use necessitates, the membrane formed can be freed from the auxiliary solvent (precipitating agent) or from the washing liquid by drying by known processes. Before this drying, it is advantageous to treat the membrane with a softening agent, for example with glycerol.

The casting solution of the aromatic polycondensate of the formula (I) can be spread onto an even substrate to form a film, for example, by the known casting technique for the production of films and foils. Hollow filaments, tubes or capillaries can be formed, for example, through an appropriately constructed shaping annular slit or a hollow needle and preferably spun directly into the auxiliary solvent (precipitating agent). In both cases, that is to say in the case of film formation or in the case of the formation of hollow filaments, tubes or capillaries, the experimental conditions can be chosen so that the auxiliary solvent (precipitating agent) can approach the membrane from one or both surface sides. A dense skin is formed on the surface(s) of the membrane in a corresponding manner on one or on both sides.

The asymmetric structure, which is an important feature of the membrane according to the invention, is achieved in a manner known to the expert during the precipitation here.

It is advantageous that the ultrafiltration rates and the dialytic permeabilities can be adapted to the desired level by varying parameters during preparation of the membranes according to the invention. These parameters to be varied are, for example, the concentration of the polymer in the casting solution, the choice of solvent, the membrane layer thickness achieved by the casting technique and the sequence of removal of the aprotic, polar solvent, it also being possible for some of the aprotic, polar solvent to be evaporated off before the removal with the aid of the auxiliary solvent.

Membranes according to the invention accordingly have an ultrafiltration rate of 0.5-1000 ml per hour, per $m^2$ and per mbar pressure difference and a dialytic permeability to chloride of 1 to $20 \times 10^{-4}$ cm per second, depending on the choice of the preparation parameters.

For purification of blood, the novel membranes of aromatic polycondensates of the formula (I) not only have the advantage of significantly improved heat stability (sterilisability) compared with the membranes of commercially available polysulphones used hitherto, but surprisingly also have the advantage of a considerably improved diffusive permeability. More harmful substances per unit time are thus separated off from the blood, which means a substantial therapeutic advantage.

The invention furthermore relates to the use of the new semipermeable membranes for reverse osmosis and ultrafiltration.

Reverse osmosis and ultrafiltration are processes for separation of substances. In these separation processes, the substances are separated by passing the solution to be separated over the surface of a semipermeable membrane under pressure, the solvent and possibly some of the dissolved substances penetrating through the membrane, while the remaining components of the solution are retained on the surface of the membrane and become enriched in the original solution.

The separation of dissolved substances from the solvent by pressure filtration, for example the removal of salts from seawater or brackish water to obtain fresh water or the removal of certain contents from process waters and production processes or the removal of undesirable substances from wastewaters, is a process which is gaining increasing importance.

Membranes of cellulose esters, in particular cellulose acetate, or of polyamides and polysulphone have hitherto chiefly acquired industrial importance.

Cellulose acetate membranes are used industrially because of their good throughput and their high separating power, although they have a number of adverse properties which limit their general usefulness. These are on the one hand a lack of chemical resistance, in particular also sensitivity to hydrolysis at a high or low pH, and the susceptibility to degradation by microorganisms. In the course of time, this leads to a deterioration in the membrane properties. Furthermore, these membranes become compacted and shrink during drying.

Asymmetric membranes are preferably prepared by a process developed by Loeb and Souriajan [Adv. Chem. Ser. 117 (1963)] and described as phase inversion. In this process, a polymer is in general dissolved in a suitable organic solvent and the solution is cast to a film, which is precipitated in a non-solvent.

Heat-stable membranes of the polycondensates to be employed according to the invention which can be used, for example, for sterile filtration or for purification of hot process waters are also of particular interest.

With the membranes according to the invention, it is possible to provide asymmetric membranes which are distinguished in particular by high flow rates coupled with a good separation efficiency, withstand a high pressure load during long-term operation and do not shrink on drying. In addition, it is also possible to provide heat-stable membranes which retain their good properties even after treatment with boiling water for several days.

In a preferred embodiment for the preparation of ultrafiltration membranes, the asymmetric membrane layer comprises a finely divided, inorganic pigment. Such pigments (fillers) are known in principle for filler-containing membranes from German Offenlegungsschrift 2,140,310 and German Offenlegungsschrift 3,141,672.

They are prepared by preparing a solution of the polymer in a solvent, preferably NMP, DMSO or DMF, at room temperature and if appropriate dispersing an inorganic filler or a pigment therein by rapid stirring. The concentration of the polymer solution is preferably 10-30% by weight. It can also additionally comprise about 1-10% by weight of $CaCl_2$ or $LiCl$.

The ultrafiltration membranes according to the invention can furthermore comprise a stable carrier material as a substrate, which carries a thin layer of polymer of the type described above as a selective, asymmetric membrane layer.

The carrier is coated by known processes by pouring the solution or dispersion onto the carrier material, after which coating thicknesses of 50–400 μm, preferably 80–150 μm, are established using a doctor blade.

Suitable carrier materials which are known per se are, in particular, non-wovens or papers of polyethylene, polypropylene, polyester, polyamide, polyphenylene sulphide or glass fibers.

After about 1–30% by weight of the solvent has evaporated at temperatures of between 40° and 100° C. in the preferred manner, the membrane is precipitated in water or another auxiliary solvent and then preserved in the customary manner, for example in a glycerol bath, and dried. The membranes can be influenced in their separating action in the customary manner by choosing the rate of evaporation.

The asymmetric membranes according to the invention, which are distinguished in comparison with the membranes known to date by a high stability under pressure coupled with an increased permeability, a high selectivity and improved shrinkage properties during drying, can be used in particular for working up dyestuff solutions or in the ultrafiltration sector for separating off or concentrating higher molecular weight substances (such as, for example, latices or proteins).

Hot, aqueous solutions can also be worked up using the heat-stable membranes according to the invention.

The use of the aromatic polycondensates of the formula (I) offers the advantage of improved heat stability compared with the polymers used to date. The ultrafiltration membranes according to the invention are also particularly suitable as a porous support structure for the preparation of composite membranes, for example for pervaporation.

EXAMPLES

The ultrafiltration rate of the membranes is determined by measuring the volume of liquid which passes through the membrane under a given pressure difference at a temperature of 37° C. through a membrane area specified for a given apparatus, and which is standardised in respect of unit area, unit time and unit pressure for general comparability. Water is used as the liquid for determining the ultrafiltration rate. The method is described, inter alia, in "Evaluation of Hemodialyzers and Dialysis Membranes" from the U.S. Department of Health, Education and Welfare, DHEW Publication No. (NIH) 77-1294, pages 24-26.

Sodium chloride serves as the test substance for uraemic toxins. The diffuse, pressureless change in concentration of two starting solutions of different concentration is measured on both sides of the membrane with respect to time by means of a Kaufmann-Leonhard cell. The $Cl^\ominus$ concentration in both cells can easily be determined by conductivity measurements.

EXAMPLE 1

20 g of an aromatic polycondensate having the formula

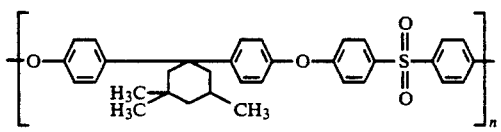

were dissolved in 80 g of NMP by stirring at 70° C. for 4 hours. The relative viscosity of the polymer was 1.207, measured on a 0.5% strength solution in $CH_2Cl_2$ at 20° C.

The casting solution was allowed to cool to 25° C. and was filtered over a Seitz Supra 100 filter layer and then degassed.

The casting solution was drawn to a film 60 μm thick on a glass plate by means of a doctor blade. The coated glass plate was then slowly placed vertically in a precipitating bath at a temperature of 25° C. containing $H_2O$ as the precipitating agent. After about 15 minutes, the membrane became detached from the glass. It was then analysed in respect of ultrafiltration rate and dialytic permeability.

The results are:

| | |
|---|---|
| UF value [ml/h × m² × mm Hg] | 191.1 |
| Cl⊖ permeability [cm/s 10⁻⁴] | 7.91 |

EXAMPLE 2

41.5 g of the aromatic polycondensate of Example 1 and 5 g of polyvinylpyrrolidone K 90, $M_w$ 360 000, were dissolved in 150 g of NMP by stirring at 70° C. for 4 hours. The casting solution was allowed to cool to 25° C. and was filtered over a Seitz Supra 100 filter layer and then degassed.

This casting solution was drawn to a film 85 μm thick on a glass plate by means of a doctor blade. The coated glass plate was then slowly placed vertically in a precipitating bath at a temperature of 25° C. containing $H_2O$ as the precipitating agent. After 15 minutes, the membrane was detached from the glass. It was then analysed in respect of ultrafiltration rate and dialytic permeability.

The results are:

| | |
|---|---|
| UF value [ml/h × m² × mm Hg] | 31.8 |
| Cl⊖ permeability [cm/s 10⁻⁴] | 3.9 |

EXAMPLE 3

To prepare an ultrafiltration membrane, a 17.5% strength by weight casting solution of an aromatic polycondensate of the formula

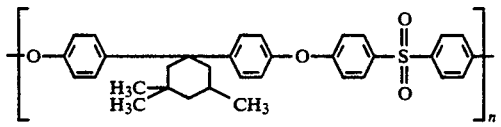

in NMP was prepared. The relative viscosity, measured on a 0.5% strength solution of the polymer in $CH_2Cl_2$ at 20° C. in an Ubbelohde viscometer, was $\eta rel = 1.48$. This casting solution was filtered, and degassed under a water pump vacuum. The viscosity of the casting solution was 11000 mPas.

The membrane was prepared by the phase inversion process with the aid of a coating unit, a polyester non-woven from Freudenberg (OF 2403) being used as the carrier material.

The following parameters were maintained during preparation of the membrane:

| | |
|---|---|
| Layer thickness of the wet application: | 300 μm |
| Web speed: | 1.43 m/min. |
| Coagulating bath: | water, 50° C. |

The following values were determined during testing of the membrane:

| | |
|---|---|
| Water flow under 1 bar: | 130 l/m² × h |
| Cut-off: | about 20,000 D, determined with standardised dextrans |

EXAMPLE 4

14 g of an aromatic polycondensate of the formula

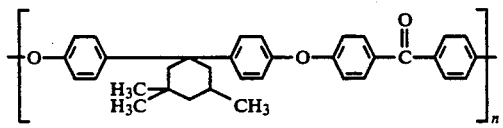

were dissolved in 86 g of NMP at 70° C. The relative viscosity of the polymer was 1.397, measured on a 0.5% strength solution in $CH_2Cl_2$.

The casting solution was allowed to cool to 25° C., and was filtered over a Seitz Supra 100 filter layer and then degassed.

This casting solution was drawn to a film 60 μm thick on a glass plate by means of a doctor blade. The coated glass plate was then slowly placed vertically in a precipitating bath at a temperature of 25° C. containing $H_2O$ as the precipitating agent. After 15 minutes, the membrane became detached from the glass. It was analysed in respect of ultrafiltration rate and dialytic permeability.

| | |
|---|---|
| UF value [ml/h × m² × mm Hg] | 130.2 |
| Cl⊖ permeability [cm/s 10⁻⁴] | 8.05 |

What is claimed is:

1. An asymmetric, semipermeable membrane of an aromatic polycondensate having recurring units of the formula $$(-O-Z-O-Y-)_n \quad (I)$$

in which n assumes numerical values from 10 to 500,

Y is the divalent radical of an aromatic sulphone or of an aromatic ketone of the formula $$-Ar-SO_2-Ar'- \quad (II)$$

or $$-Ar-CO-Ar'- \quad (III)$$

in which

—Ar— and —Ar'—independently of one another are difunctional aromatic radicals having 6 to 50 C atoms, and $$-O-Z-O- \quad (IV)$$

is a divalent diphenolate radical, wherein, amongst the diphenolate radicals —O—Z—O—, 0.1-100 mol % of all the diphenolate radicals are those of the formula

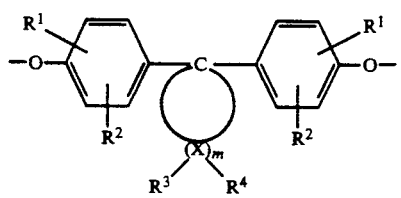

in which

R$^1$ and R$^2$ independently of one another denote hydrogen, halogen, C$_1$–C$_8$-alkyl, C$_5$–C$_6$-cycloalkyl, C$_6$–C$_{10}$-aryl or C$_7$–C$_{12}$-aralkyl, m represents an integer from 4 to 7, R$^3$ and R$^4$ independently of one another represent hydrogen or C$_1$–C$_6$-alkyl and X denotes carbon, wherein R$^3$ and R$^4$ can differ for each X, and on at least one X, the substituents R$^3$ and R$^4$ simultaneously represent alkyl, the variables having values which impart to said membrane properties which maximize patient comfort while minimizing risk and stress during treatment.

2. The membrane of claim 1, wherein the diphenolate radicals (V) are present in an amount of 3-100 mol% of all the diphenolate radicals.

3. The membrane of claim 2, wherein the diphenolate radicals (V) are present in an amount of 10-100 mol% of all the diphenolate radicals.

4. The membrane of claim 1, wherein the diphenolate radicals (V) originate from one or more of the diphenols of the formulae

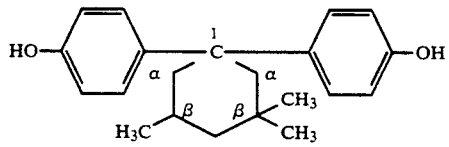

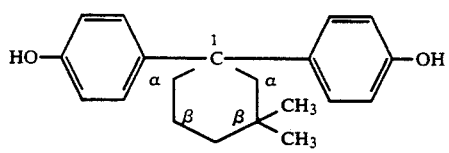

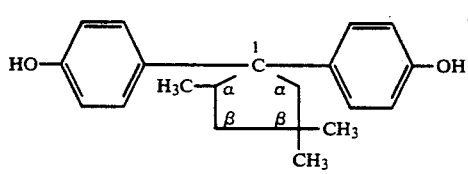

5. The membrane of claim 4, wherein the diphenolate radicals (V) originate from the diphenol of the formula (VI).

6. The membrane of claim 1, wherein n assumes numerical values from 25 to 100.

7. The membrane of claim 1, wherein halogen is chlorine or bromine.

8. The membrane of claim 1, wherein R$^1$ and R$^2$ independently of one another denote phenyl-C$_1$–C$_4$-alkyl.

9. The membrane of claim 8, wherein R$^1$ and R$^2$ independently of one another denote benzyl or cumyl.

10. The membrane of claim 1, wherein n represents the integer 4 or 5.

11. The membrane of claim 1, wherein R$^3$ and R$^4$ are simultaneously alkyl on 1-2 atoms X.

12. The membrane of claim 10, wherein R$^3$ and R$^4$ are simultaneously alkyl on only one atom X.

13. The membrane of claim 1, wherein the X atoms in the α-position relative to the di-phenyl-substituted C atom (C 1) are not dialkyl-substituted.

14. The membrane of claim 1, wherein the X atoms in the β-position relative to the di-phenyl-substituted C atom (C 1) are dialkyl-substituted.

15. A process for the preparation of a membrane of claim 1, wherein the aromatic polycondensation is dissolved in an aprotic, polar solvent in an amount of 5-30% by weight, based on the total solution, solubilising agents and/or pore-forming agents being added, the resulting solution is processed to shaped articles, such as films, tubes, hollow filaments or capillaries, and the resulting shaped articles are treated with an auxiliary solvent which is miscible with the solvent but does not dissolve the polycondensate.

16. A process comprising:

providing an asymmetric, semipermeable membrane of an aromatic polycondensate having recurring units of the formula (—O—Z—O—Y—)a in which n assumes numerical values from 10 to 500, Y is the divalent radical of an aromatic sulphone or of an aromatic ketone of the formula

or

in which

—Ar—and —Ar'—independently of one another are difunctional aromatic radicals having 6 to 50 C atoms, and

is a divalent diphenolate radical, wherein, amongst the diphenolate radicals —O—Z—O—, 0.1-100 mol % of all the diphenolate radicals are those of the formula

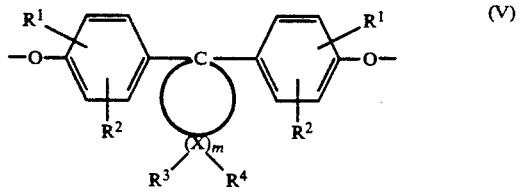

in which

R$^1$ and R$^2$ independently of one another denote hydrogen, halogen, C$_1$–C$_8$-alkyl, C$_5$–C$_6$-cycloalkyl, C$_6$–C$_{10}$-aryl or C$_7$–C$_{12}$-aralkyl, m represents an integer from 4 to 7, R$^3$ and R$^4$ independently of one another represent hydrogen or C$_1$–C$_8$-alkyl and x denotes carbon, wherein $R^3$ and $R^4$ can differ for each X, and on at least one X, the substituents $R^3$ and $R^4$ simultaneously represent alkyl, the variables having values which impart to said membrane properties which maximize patient comfort while minimizing risk and stress during treatment, and carrying out hemodialysis, haemodiafiltration, haemofiltration, ultrafiltration, microfiltration or reverse osmosis with said membrane.

* * * * *